United States Patent
Xu et al.

(10) Patent No.: US 11,112,228 B2
(45) Date of Patent: Sep. 7, 2021

(54) RUNOUT DETECTION DEVICE

(71) Applicant: CITIC Dicastal CO., LTD, Qinhuangdao (CN)

(72) Inventors: Zuo Xu, Qinhuangdao (CN); Guoyuan Xiong, Qinhuangdao (CN); Bowen Xue, Qinhuangdao (CN); Haifeng Yuan, Qinhuangdao (CN); Changcun Xiao, Qinhuangdao (CN); Jiandong Guo, Qinhuangdao (CN)

(73) Assignee: CITIC DICATAL CO., LTD, Hebei (CN)

( * ) Notice: Subject to any disclaimer, the term of this patent is extended or adjusted under 35 U.S.C. 154(b) by 258 days.

(21) Appl. No.: 16/404,389

(22) Filed: May 6, 2019

(65) Prior Publication Data

US 2020/0003541 A1    Jan. 2, 2020

(30) Foreign Application Priority Data

Jul. 2, 2018    (CN) .......................... 201810736880.7

(51) Int. Cl.
*G01B 5/18*    (2006.01)
*G01B 3/28*    (2006.01)

(52) U.S. Cl.
CPC ................. *G01B 5/18* (2013.01); *G01B 3/28* (2013.01)

(58) Field of Classification Search
CPC . G01B 5/18; G01B 3/28; G01B 5/003; G01B 5/0002
USPC .......................................................... 33/836
See application file for complete search history.

(56) References Cited

U.S. PATENT DOCUMENTS

| | | | | |
|---|---|---|---|---|
| 4,285,132 A * | 8/1981 | Kloster | .................. | G01B 5/252 33/550 |
| 5,301,436 A * | 4/1994 | Johnston | .................. | F42B 35/02 33/506 |
| 5,974,878 A * | 11/1999 | Newell | .................... | B23B 5/04 73/462 |
| 2009/0205420 A1* | 8/2009 | Andersen | ................ | G01M 1/08 73/487 |
| 2011/0113637 A1* | 5/2011 | Inoue | ..................... | G01B 5/255 33/203 |
| 2018/0038678 A1* | 2/2018 | Gouko | .................. | F01D 17/085 |
| 2020/0003541 A1* | 1/2020 | Xue | ........................ | G01B 5/003 |
| 2021/0131784 A1* | 5/2021 | Baldwin | ................ | G01B 5/201 |

FOREIGN PATENT DOCUMENTS

CN    206073900 U    4/2017

\* cited by examiner

*Primary Examiner* — Yaritza Guadalupe-McCall
(74) *Attorney, Agent, or Firm* — Calfee, Halter & Griswold LLP

(57) ABSTRACT

The present application relates to a runout detection device, which includes a base plate, lateral plates, guide sleeves, springs and dial gauges, etc. During the operation, the sliding sleeve and the lateral dial gauge are moved along the sliding groove in the lateral formwork, so that the runout of right end of the work piece may be measured. The bottom plate of the lower end measuring device is placed above the base plate, the ball at the top end of the probe is always in contact with the lower end of the work piece under the action of the upper spring, the probe is pressed down when contacting a projection, and the L-shaped plate is rotated clockwise through the head nail, at this time, the runout of the lower end of the work piece may be known by the reading of the lower dial gauge.

1 Claim, 4 Drawing Sheets

RUNOUT DETECTION DEVICE

CROSS-REFERENCE TO RELATED APPLICATIONS

This application claims priority to Chinese Patent Application No. 201810736880.7 filed on Jul. 2, 2018, which is hereby incorporated by reference in its entirety.

TECHNICAL FIELD

The present application relates to a detection device, and more particularly to a runout detection device.

BACKGROUND ART

The cylinder head of an automobile is generally cast by high-pressure molding, and it is necessary to detect the runout of the depth in order to ensure the depth of the machined seal grooves in the bottom and the side. A runout measurement is usually made by a coordinate measuring machine (CMM), but this measurement is very inefficient thus severely restricting the increase in production efficiency.

SUMMARY OF THE INVENTION

It is an object of the present application to provide a runout detection device which may measure the runout of a seal groove in the side and the bottom of a high-pressure cast work piece.

In order to achieve the above object, the technical solution of the present application is: Runout detection device, includes feet, a base plate, a left spring, a left guide sleeve, a left screw, a left guide post, a support column, a right spring, a right guide sleeve, a right screw, a right guide post, a lateral formwork, a sliding sleeve, a lateral dial gauge, a lower dial gauge, a left vertical plate, an upper screw, a fixing block, an upper spring, a probe, a lateral screw, a head nail, lateral vertical plates, a bottom plate, an L-shaped plate and a lower spring. Four feet are fixed at four corners below the base plate. The left guide sleeve is fixed above the base plate. Upper part of the left guide post is tapered, and lower part thereof is cylindrical and is matched with inner hole of the left guide sleeve. The left screw is fixed to upper end of the left guide sleeve, and top end of the left screw is matched with a slot in the left guide post. The left spring is installed in the left guide sleeve and provided under the left guide post. The support post is fixed above the base plate, and the right guide sleeve is fixed above the base plate. Upper part of the right guide post is tapered, and lower part thereof is cylindrical and is matched with inner hole of the right guide sleeve. The right screw is fixed to upper end of the right guide sleeve, and top end of the right screw is matched with a slot in the right guide post. The right spring installed in the right guide sleeve and provided under the right guide post. The lateral formwork is fixed to right side of the base plate, parallel to the side of the work piece. The lateral formwork is provided with a sliding groove in the measured surface of the side of the measured work piece. The sliding sleeve is matched with the sliding groove in the lateral formwork. The lateral dial gauge is fixed to the sliding sleeve.

Lower end measuring device includes: the lower dial gauge is fixed to left side of the left vertical plate; the fixing block is fixed above the bottom plate and provided on right side of the left vertical plate; two lateral vertical plates are fixed above the bottom plate and respectively provided on front and rear sides of the fixing block; the L-shaped plate is installed between the two lateral vertical plates through pins; the lower spring is installed between the fixing block and the L-shaped plate and provided above the L-shaped plate; the upper screw is installed in upper part of the fixing block, and top end thereof is in contact with top end of left side of the L-shaped plate; top end of the probe is a ball and lower end thereof is a stepped cylinder, and the cylinder of the lower end of the probe is matched with a hole in right side of the fixing block; the upper spring is provided below the probe to ensure that the ball at top end of the probe may be always lifted; the lateral screw is installed in right side of the fixing block, and top end thereof is matched with a slot in the probe; and the head nail is fixed to the L-shaped plate, and a ball at top end of the head nail is always in contact with the lower end of the probe.

During the operation, two positioning holes in a work piece are respectively matched with the left guide post and the right guide post, and the left guide post and the right guide post are pressed downward, so that lower end of the work piece is simultaneously in contact with upper ends of the left guide sleeve, the right guide sleeve and the support column. Left side of a flange on the sliding sleeve is always in contact with right side of the lateral formwork, the sliding sleeve and the lateral dial gauge are moved along the sliding groove in the lateral formwork, so that the runout of right end of the work piece may be measured. The bottom plate of the lower end measuring device is placed above the base plate, the ball at the top end of the probe is always in contact with the lower end of the work piece under the action of the upper spring, the probe is pressed down when contacting a projection, and the L-shaped plate is rotated clockwise through the head nail, at this time, the runout of the lower end of the work piece may be known by the reading of the lower dial gauge.

The application may measure the runout of the sealing groove in the side and the bottom of the high-pressure cast work piece in use, and has the characteristics of high measurement precision, simple structure and low production cost.

Figure 1:
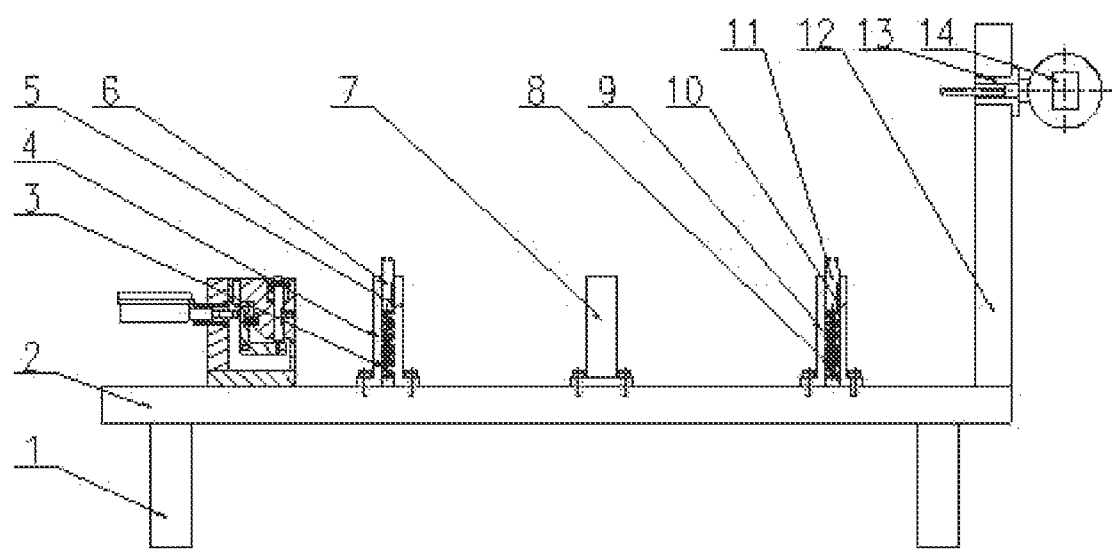
FIG. 1 is a front view of a runout detection device of the present application.
Figure 2:
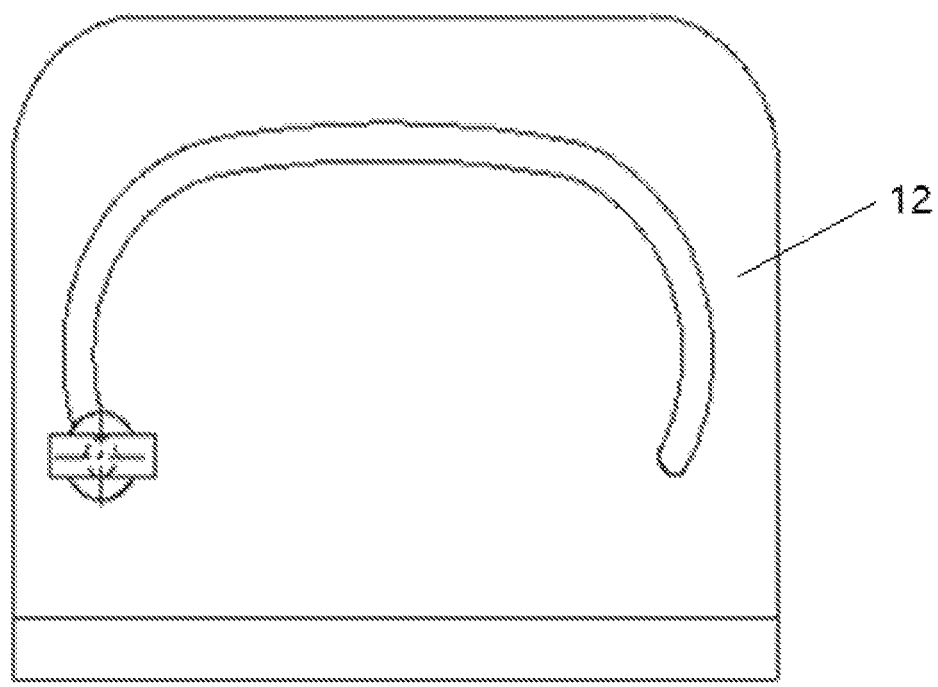
FIG. 2 is a right view of the runout detection device of the present application.
Figure 3:
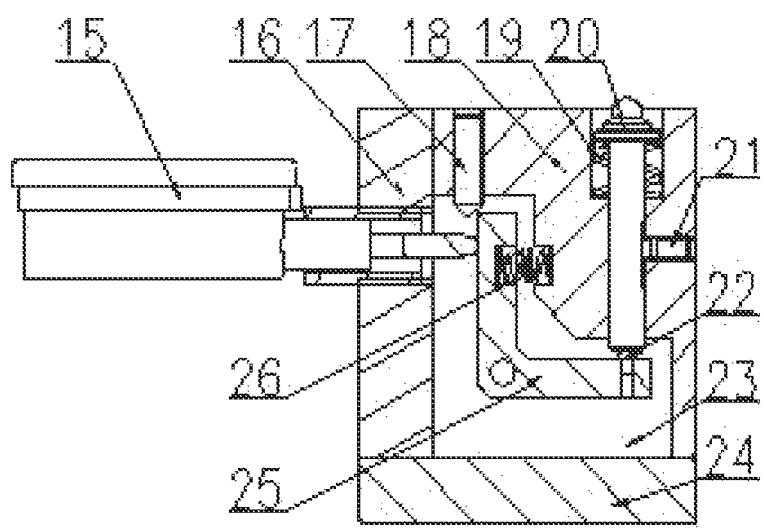
FIG. 3 is a front view of a lower end measuring device of the present application.
Figure 4:
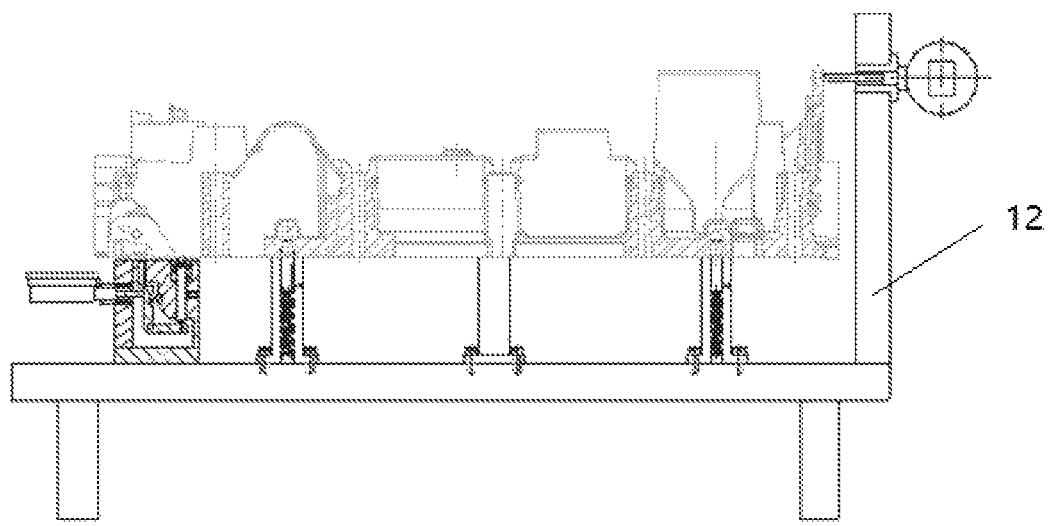
FIG. 4 is a front view of the runout detection device of the present application after the work piece is clamped.

In which, 1—foot, 2—base plate, 3—left spring, 4—left guide sleeve, 5—left screw, 6—left guide post, 7—support column, 8—right spring, 9—right guide sleeve, 10—right screw, 11—right guide post, 12—lateral formwork, 13—sliding sleeve, 14—lateral dial gauge, 15—lower dial gauge, 16—left vertical plate, 17—upper thread, 18—fixing block, 19—upper spring, 20—probe, 21—lateral screw, 22—head nail, 23—lateral vertical plate, 24—bottom plate, 25—L-shaped plate, 26—lower spring.

DETAILED DESCRIPTION OF THE INVENTION

The details and operation of a specific device according to the present application will be described below with reference to the accompanying drawings.

The device includes feet 1, a base plate 2, a left spring 3, a left guide sleeve 4, a left screw 5, a left guide post 6, a support column 7, a right spring 8, a right guide sleeve 9, a right screw 10, a right guide post 11, a lateral formwork 12, a sliding sleeve 13, a lateral dial gauge 14, a lower dial gauge 15, a left vertical plate 16, an upper screw 17, a fixing block 18, an upper spring 19, a probe 20, a lateral screw 21, a head nail 22, lateral vertical plates 23, a bottom plate 24, an L-shaped plate 25 and a lower spring 26. Four feet 1 are fixed at four corners below the base plate 2. The left guide sleeve 4 is fixed above the base plate 2. Upper part of the left guide post 6 is tapered, and lower part thereof is cylindrical and is matched with inner hole of the left guide sleeve 4. The left screw 5 is fixed to upper end of the left guide sleeve 4, and top end of the left screw 5 is matched with a slot in the left guide post 6. The left spring 3 is installed in the left guide sleeve 4 and provided under the left guide post 6. The support post 7 is fixed above the base plate 2, and the right guide sleeve 9 is fixed above the base plate 2. Upper part of the right guide post 11 is tapered, and lower part thereof is cylindrical and is matched with inner hole of the right guide sleeve 9. The right screw 10 is fixed to upper end of the right guide sleeve 9, and top end of the right screw is matched with a slot in the right guide post 11. The right spring 8 installed in the right guide sleeve 9 and provided under the right guide post 11. The lateral formwork 12 is fixed to right side of the base plate 2, parallel to the side of the work piece. The lateral formwork 12 is provided with a sliding groove in the measured surface of the side of the measured work piece. The sliding sleeve 13 is matched with the sliding groove in the lateral formwork 12. The lateral dial gauge 14 is fixed to the sliding sleeve 13.

Lower end measuring device includes: the lower dial gauge 15 is fixed to left side of the left vertical plate 16; the fixing block 18 is fixed above the bottom plate 24 and provided on right side of the left vertical plate 16; two lateral vertical plates 23 are fixed above the bottom plate 24 and respectively provided on front and rear sides of the fixing block 18; the L-shaped plate 25 is installed between the two lateral vertical plates 23 through pins; the lower spring 26 is installed between the fixing block 18 and the L-shaped plate 25 and provided above the L-shaped plate 25; the upper screw 17 is installed in upper part of the fixing block 18, and top end thereof is in contact with top end of left side of the L-shaped plate 25; top end of the probe 20 is a ball and lower end thereof is a stepped cylinder, and the cylinder of the lower end of the probe 20 is matched with a hole in right side of the fixing block 18; the upper spring 19 is provided below the probe 20 to ensure that the ball at top end of the probe 20 may be always lifted; the lateral screw 21 is installed in right side of the fixing block 18, and top end thereof is matched with a slot in the probe 20; and the head nail 22 is fixed to the L-shaped plate 25, and a ball at top end of the head nail 22 is always in contact with the lower end of the probe 20.

During the operation, two positioning holes in a work piece are respectively matched with the left guide post 6 and the right guide post 11, and the left guide post 6 and the right guide post 11 are pressed downward, so that lower end of the work piece is simultaneously in contact with upper ends of the left guide sleeve 4, the right guide sleeve 9 and the support column 7. On the sliding sleeve 13, left side of a flange is always in contact with right side of the lateral formwork 12, the sliding sleeve 13 and the lateral dial gauge 14 are moved along the sliding groove in the lateral formwork 12, so that the runout of right end of the work piece may be measured. The bottom plate 24 of the lower end measuring device is placed above the base plate 2, the ball at the top end of the probe 20 is always in contact with the lower end of the work piece under the action of the upper spring 19, the probe 20 is pressed down when contacting a projection, and the L-shaped plate 25 is rotated clockwise through the head nail 22, at this time, the runout of the lower end of the work piece may be known by the reading of the lower dial gauge 15.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. Runout detection device, comprising: four feet, a base plate, a left spring, a left guide sleeve, a left screw, a left guide post, a support column, a right spring, a right guide sleeve, a right screw, a right guide post, a lateral formwork, a sliding sleeve, a lateral dial gauge, a lower dial gauge, a left vertical plate, an upper screw, a fixing block, an upper spring, a probe, a lateral screw, a head nail, lateral vertical plates, a bottom plate, an L-shaped plate and a lower spring, the four feet are fixed at four corners below the base plate; the left guide sleeve is fixed above the base plate; upper part of the left guide post is tapered, and lower part thereof is cylindrical and is matched with inner hole of the left guide sleeve; the left screw is fixed to upper end of the left guide sleeve, and top end of the left screw is matched with a slot in the left guide post; the left spring is installed in the left guide sleeve and provided under the left guide post; the support post is fixed above the base plate, and the right guide sleeve is fixed above the base plate; upper part of the right guide post is tapered, and lower part thereof is cylindrical and is matched with inner hole of the right guide sleeve; the right screw is fixed to upper end of the right guide sleeve, and top end of the right screw is matched with a slot in the right guide post; the right spring installed in the right guide sleeve and provided under the right guide post; the lateral formwork is fixed to right side of the base plate, parallel to the side of the work piece; the lateral formwork is provided with a sliding groove in the measured surface of the side of the measured work piece; the sliding sleeve is matched with the sliding groove in the lateral formwork; the lateral dial gauge is fixed to the sliding sleeve;

a lower end measuring device comprises: the lower dial gauge is fixed to left side of the left vertical plate; the fixing block is fixed above the bottom plate and provided on right side of the left vertical plate; two lateral vertical plates are fixed above the bottom plate and respectively provided on front and rear sides of the fixing block; the L-shaped plate is installed between the two lateral vertical plates through pins; the lower spring is installed between the fixing block and the L-shaped plate and provided above the L-shaped plate; the upper screw is installed in upper part of the fixing block, and top end thereof is in contact with top end of left side of the L-shaped plate; top end of the probe is a ball and lower end thereof is a stepped cylinder, and the cylinder of the lower end of the probe is matched with a hole in right side of the fixing block; the upper spring is provided below the probe to ensure that the ball at top end of the probe is configured to be always lifted; the lateral screw is installed in right side of the fixing block, and top end thereof is matched with a slot in the probe; and the head nail is fixed to the L-shaped plate, and a ball at top end of the head nail is always in contact with the lower end of the probe.

* * * * *